(12) United States Patent
Friedli

(10) Patent No.: US 7,936,249 B2
(45) Date of Patent: May 3, 2011

(54) SYSTEM FOR SECURITY CONTROL AND/OR TRANSPORTATION OF PERSONS WITH AN ELEVATOR INSTALLATION, METHOD OF OPERATING THIS SYSTEM, AND METHOD OF RETROFITTING AN ELEVATOR INSTALLATION WITH THIS SYSTEM

(75) Inventor: Paul Friedli, Remetschwil (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/300,497

(22) Filed: Nov. 20, 2002

(65) Prior Publication Data

US 2003/0098776 A1 May 29, 2003

(30) Foreign Application Priority Data

Nov. 26, 2001 (EP) .................................. 01811140

(51) Int. Cl.
*G05B 19/00* (2006.01)
*G06F 7/04* (2006.01)
*H04B 1/00* (2006.01)
(52) U.S. Cl. .................. 340/5.5; 340/5.52; 340/5.53
(58) Field of Classification Search .................. 187/392, 187/381, 384, 391; 340/5.5, 5.15, 5.52, 5.82; 713/186, 182, 200; 705/1, 4; 235/375; 704/275
See application file for complete search history.

(56) References Cited

U.S. PATENT DOCUMENTS

| | | | |
|---|---|---|---|
| 4,109,237 A | 8/1978 | Hill | |
| 4,449,189 A | 5/1984 | Feix et al. | |
| 4,534,056 A * | 8/1985 | Feilchenfeld et al. | 704/272 |
| 4,590,604 A | 5/1986 | Feilchenfeld et al. | |
| 4,979,594 A * | 12/1990 | Begle et al. | 187/380 |
| 4,993,068 A * | 2/1991 | Piosenka et al. | 713/186 |
| 5,615,622 A | 4/1997 | Moses et al. | 109/28 |
| 5,616,894 A * | 4/1997 | Nieminen et al. | 187/247 |
| 5,689,094 A | 11/1997 | Friedli et al. | |

(Continued)

FOREIGN PATENT DOCUMENTS

CA 2304434 10/2000

(Continued)

OTHER PUBLICATIONS

Notice of Opposition to a European Patent for European Patent No. 1314676.

(Continued)

*Primary Examiner* — Brian A Zimmerman
*Assistant Examiner* — Nam V Nguyen
(74) *Attorney, Agent, or Firm* — Wolff & Samson, PC

(57) ABSTRACT

A system for security control and/or transportation of persons with an elevator installation and a method of operating this system. By means of the system, a person is identified from at least one identification code and from at least one authentication signal. For this purpose, an identification code is entered and/or transmitted by the person, and an authentication signal of the person is captured. Assigned to the identification code and the authentication signal is at least one user profile. An access authorization stored in the user profile, and/or a pre-defined travel destination in the user profile, is/are determined. The authentication signal is checked against at least one reference stored in a user profile. If an access authorization to a travel destination is present, and if the authentication signal and reference correspond, a command signal is transmitted to an elevator installation.

17 Claims, 1 Drawing Sheet

U.S. PATENT DOCUMENTS

| | | | |
|---|---|---|---|
| 5,719,950 A | | 2/1998 | Osten et al. |
| 5,903,225 A | * | 5/1999 | Schmitt et al. ............... 340/5.25 |
| 5,932,853 A | | 8/1999 | Friedli et al. .................. 340/258 |
| 5,949,037 A | * | 9/1999 | Oya .............................. 187/392 |
| 5,952,626 A | * | 9/1999 | Zaharia ......................... 187/381 |
| 5,991,429 A | | 11/1999 | Coffin et al. |
| 6,109,396 A | * | 8/2000 | Sirag et al. .................... 187/381 |
| 6,354,405 B1 | * | 3/2002 | Svensson-Hilford et al. ............................ 187/384 |
| 6,382,363 B1 | | 5/2002 | Friedli |
| 6,397,976 B1 | * | 6/2002 | Hale et al. ..................... 187/392 |
| 6,484,260 B1 | * | 11/2002 | Scott et al. .................... 713/186 |
| 6,615,175 B1 | * | 9/2003 | Gazdzinski ................... 704/275 |
| 6,707,374 B1 | * | 3/2004 | Zaharia ......................... 340/5.31 |
| 6,728,881 B1 | * | 4/2004 | Karamchetty ................ 713/186 |
| 6,801,792 B1 | | 10/2004 | Schuster et al. |
| 6,867,683 B2 | * | 3/2005 | Calvesio et al. ............. 340/5.52 |

FOREIGN PATENT DOCUMENTS

| | | |
|---|---|---|
| EP | 698 617 | 3/1966 |
| EP | 832 839 | 4/1998 |
| EP | 0 971 330 A1 | 1/2000 |
| EP | 1 043 260 A1 | 10/2000 |
| JP | 2-43185 | 2/1990 |
| JP | 3241182 | 10/1991 |
| JP | 3297773 | 12/1991 |
| JP | 4073384 | 3/1992 |
| JP | 5163860 | 6/1993 |
| JP | 08-337364 | 12/1996 |
| JP | 10037551 | 2/1998 |
| JP | 10109843 | 4/1998 |
| JP | 11-278761 | 10/1999 |
| JP | 11280317 | 10/1999 |
| JP | 11-322203 | 11/1999 |
| WO | 0125128 | 4/2001 |
| WO | WO 01/25128 | 4/2001 |

OTHER PUBLICATIONS

Official Action of the Japanese Patent Office dated May 12, 2008, for Japanese Patent Application No. 2002-328098.

Official Action of the Japanese Patetn Office datted Sep. 17, 2008, for Japanese Patent Application No. 2002-328098.

* cited by examiner

SYSTEM FOR SECURITY CONTROL AND/OR TRANSPORTATION OF PERSONS WITH AN ELEVATOR INSTALLATION, METHOD OF OPERATING THIS SYSTEM, AND METHOD OF RETROFITTING AN ELEVATOR INSTALLATION WITH THIS SYSTEM

BACKGROUND OF THE INVENTION

The invention relates to a system for security control and/or transportation of persons with an elevator installation, a method of operating this system, and a method of retrofitting an elevator installation with this system.

Systems for security control of persons are known. For example, such systems control the entering/leaving of persons to/from buildings, floors, rooms, etc.

Systems for the transportation of persons allow transportation of persons in means of transport, which transportation is controlled by identification. Thus, patent specification EP 0699617 discloses a device for commanding an elevator installation in which the elevator installation is commanded by a person with an identification code. A recognition device recognizes the identification code and passes it on as a control signal to a processing unit. The processing unit reads the control signal and assigns to it a pre-defined desired travel destination. The bearer of the identification code is thereby identified, and a travel destination is assigned to such bearer. The processing unit transmits a corresponding control signal to the elevator installation, which then transports the person to the travel destination automatically.

Now, it has proven to be a disadvantage that unauthorized persons can make use of the identification code to obtain access to buildings, floors, rooms, etc., and to have themselves transported by the elevator installation.

SUMMARY OF THE INVENTION

The task of the invention is to provide a system for security control and/or transportation of persons with an elevator installation, and a method of operating this system, by means of which the reliability of the identification is increased.

The invention solves this task by a person who is to be transported with an elevator installation being not only identified, but also authenticated. Identification means determine whether for an identification code an access authorization and/or a pre-defined travel destination exists. Authentication means check whether the person really is the person they claim to be.

According to the invention, a person is identified by at least one identification code and by at least one authentication signal. For this purpose, the person enters and/or transmits an identification code, and an authentication signal of the person is captured. At least one user profile is assigned to the identification code and to the authorization code. An access authorization stored in the user profile, and/or a travel destination pre-defined in the user profile, is/are determined. The authentication signal is checked against at least one reference stored in the user profile.

If an access authorization to a travel destination is present, and if the authentication signal and reference correspond, at least one command signal is transmitted to the elevator installation to transport the person to the travel destination. If this is not the case, at least one alarm signal is transmitted to lock the person in the elevator car, and/or to deny the person access to the elevator installation.

As the authentication signal, a biometric signal is used. Advantageously, for the authentication signal, use is made of a fingerprint, and/or a hand geometry, and/or a facial profile, and/or an iris pattern, and/or a retinal scan, and/or a thermogram, and/or an odor, and/or a weight, and/or a voice, and/or a signature, and/or a keystroke, and/or a walking sequence.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
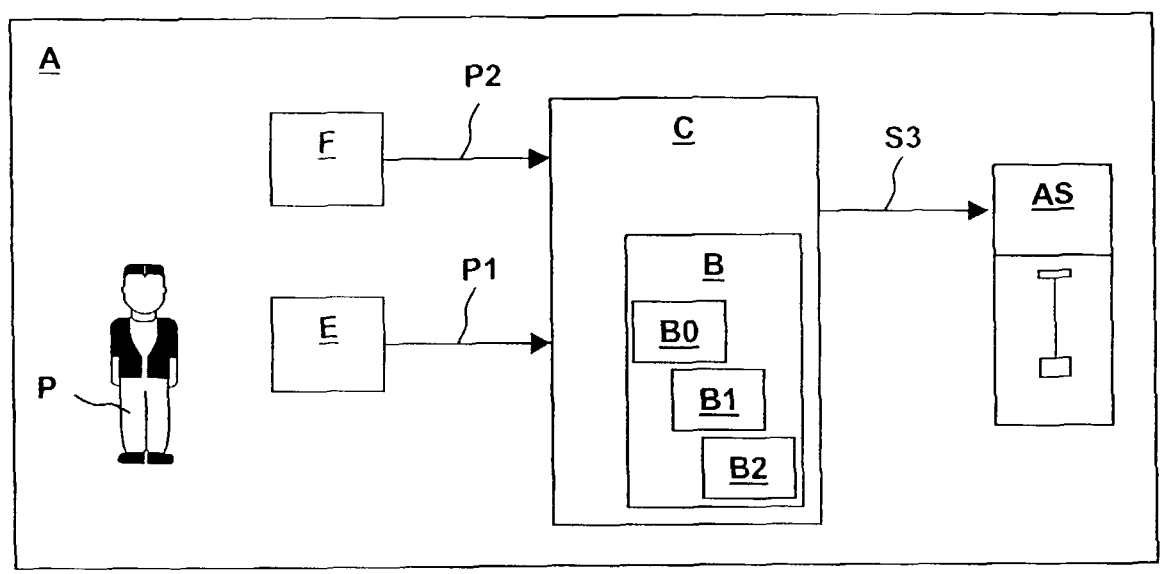
FIG. 1 is a diagram illustrating the principle of a system for security control and/or transportation of persons pursuant to the present invention.

In this diagram illustrating the inventive principle, a person P is transported with an elevator installation A. Instead of a person, a goods item can also be transported. The elevator installation A may be any elevator with an elevator car, a drive, and an elevator control AS, which is installed in a building. A drive and an elevator car fastened to a suspension rope are shown diagrammatically. All known and proven elevator installations may be used.

Identification of the person P takes place via a recognition device E. Preferably, the person P enters an identification code P1, for example via a keyboard, and/or the person P transmits an identification code P1, for example with a transponder by radio. Such a recognition device E is advantageously mounted at an entrance to the elevator installation A. Preferably, the recognition device E is a terminal. Preferably, such a terminal is mounted close to a landing door of the elevator installation A.

The authentication of the person P take place via an authentication device F. Preferably, at least one authentication signal P2 of the person P is captured. Capturing of an authentication signal takes place inside, preferably after entering, the elevator car, and/or outside, preferably before entering, the elevator car. With authentication inside the elevator car, the elevator car is used as a security compartment, i.e. the elevator door is closed and locked, and only on positive authentication is the elevator car caused to travel. Self-evidently, with knowledge of the present invention, a person skilled in the art can realize combinations of these exemplary embodiments.

The following biometric methods of authentication are preferably used:

Fingerprint: A fingerprint of the person P is captured, for example scanned. Preferably, the person P places their finger on a surface of the authentication device F, where a fingerprint is photographed in shades of gray by a camera. Preferably, the shades of gray are digitized, and/or the line widths are reduced. Details are marked.

Hand geometry: Dimensions of a hand of person P are captured. Preferably, the person P places their hand on a surface of the authentication device F, where a three-dimensional silhouette of the hand is photographed by a camera. Preferably, protrusions aid positioning of the hand.

Facial profile: A facial profile of the person P can be captured as a three-dimensional model and/or a two-dimensional pattern and/or as an infrared image, or as a combination of these methods. It is also possible for black-and-white or colored images to be captured. The angle of recording can vary, so that profile images and/or frontal images and/or general perspectives can be captured. In relation to time, a static image and/or an image sequence can be captured. The person P is placed in front of the authentication device F and photographed in facial profile by a camera.

Iris profile: A texture of the iris of the person P is captured. Preferably, the person P stands at a distance of a few decimeters in front of the authentication device F and looks into a camera, which camera photographs the iris texture. This photograph is digitized into an iris code. Preferably, the iris is divided into annular areas, and characteristic features are marked.

Retinal scan: A structure of the veins of the retina of the person P is captured, for example scanned. Preferably, the person P stands at a distance of several decimeters from the authentication device F and looks into a camera, which camera photographs the structure of the veins of the retina. Preferably, for this purpose the eye is radiated with infrared light. The photoreceptive structures of the eye reflect the infrared light, which reflections are photographed. This photograph is digitized into a retinal code and characteristic features are marked.

Thermogram: Heat radiation from the person P is captured. Preferably, a heat camera of the authentication device F photographs a facial and/or whole-body thermogram.

Odor: An odor of the person P is captured by an odor sensor of the authentication device F.

Weight: The weight of a person P is captured by a scale of the authentication device F.

Voice: Vocal pitch and/or breaking voice and/or accents and/or speech impediments of the person P are captured. For this purpose, the person P speaks into a microphone of the authentication device F, and one or more phrases are recorded.

Signature: A signature of the person P is captured, for example scanned. The person P writes a signature on a surface of the authentication device F, which signature is photographed by a camera. Preferably, strokes and/or dynamics and/or sounds of writing the signature are marked and/or determined.

Keystroke: The way in which keys of a keyboard are depressed by the person P is captured. Preferably, the authentication device F determines with sensors the force and/or dynamics of the keystroke.

Walking sequence: The walk of the person P is captured as a sequence. Preferably, the walk of the person P is photographed by a camera of the authentication device F. Preferably, from several walking sequences a walking sequence typical for the person is established.

At least one authentication signal P2 is advantageously digitized and, in a preceding step of the method, stored as reference B2. The system has a least one control device C, which control device C is, for example, a computing device with a data store, in which data store at least one user profile B of the person P is stored. The user profile B has an access authorization B0 to a travel destination, and/or a pre-defined travel destination B1, and/or a reference B2. The control device C can be a central remote server, which communicates by radio and/or wire with the recognition device E, the authentication device F, and the elevator installation A. For the purpose of security control and/or transportation, the person P enters an identification code P1 to a recognition device E, and/or transmits an identification code P1 to a recognition device E. Further, an authentication device F captures an authentication signal P2 of the person P. This identification code P1 and this authentication signal P2 are transmitted by the recognition device E, or the authentication device F respectively, to the control device C.

The control device C checks whether for the identification code P1 a user profile B exists. If the identification check is positive, this user profile B is opened.

Preferably, information about the travel destination of the person P is available to the control device C. The control device C now checks whether the person P is authorized to be transported to this travel destination. To do this, it checks whether the travel destination is listed in the access authorization B0.

The control device C checks further, whether the authentication signal P2 corresponds with the reference B2 stored in the user profile B. For this purpose, certain characteristic features of authentication signal P2 and reference B2 are compared with each other.

If the authentication check is positive, the control device C transmits at least one command signal S3 to the elevator control AS of the elevator installation A, to transport the person P to the travel destination. If the authentication check is negative, the control device C transmits at least one alarm signal. If authentication takes place inside the elevator car, the elevator door is closed and locked, for example, and the elevator does not commence travel. If authentication takes place outside the elevator car, the landing door to the elevator installation A is not opened, for example. Also in the case of a negative authentication check, a security service can be alarmed.

The authentication signals P2 can be more or less certainly related to a person P, and the acceptance on the part of the user of undergoing an authentication is more or less high. Thus, the iris pattern can be related to a person P with great certainty, but the acceptance of iris-pattern authentication is low. Thus, the weight can be related to a person P with low certainty, but the acceptance of a weight authentication is high.

Certain authentication signals P2 cannot always be individually determined, and only for a small number of persons P to be authenticated are they relatively accurate. For example, on average taken over a year, with a scale in the floor of the elevator car the weight of a person P is determined to +/−10%. However, because the person P is often transported in the elevator car with other persons P—and the weight of the person P is thereby indirectly determined as the group weight—the weight, as relatively accurately known authentication signal P2, is only suitable for a small number of persons P to be authenticated, for example for groups of up to five persons P. Even though accuracy of weight determination by a scale in the floor of the elevator car is low, from the determination of the group weight the number of the persons P to be transported can be determined accurately, i.e. whether there are really three persons, and not two or four persons.

In a preferred exemplary embodiment, at least two authentication signals P2 of at least one person P are captured and evaluated. Particularly in high-security systems—and thus in security-sensitive buildings such as banks, military, etc.—several authentication signals P2 from a person P are captured and evaluated. For example, a fingerprint and/or an iris pattern, as well as the weight, of the person P is/are captured. The certainty of the authentication is thereby greatly increased.

This method can be retrofitted into existing elevator installations A with a recognition device E by installing an authentication device F. The components of the authentication device F are commercially available and inexpensive.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A method for security control and/or transportation of persons with an elevator installation, comprising the steps of:
   identifying a person at a first location external to an elevator car, from at least one identification code by way of a recognition device mounted in close proximity to a landing door of the elevator installation, the identifying step occurring prior to entry of the person into the elevator car;
   authenticating the person at a second, different location, from at least one biometric authentication signal by an authentication device mounted before or in the elevator car, to check the identifying step;
   assigning at least one user profile to the at least one identification code and the at least one biometric authentication signal; and
   checking the at least one biometric authentication signal against at least one reference stored in the user profile
   wherein the identifying step includes at least one of entering and transmitting the at least one identification code by the person, the method further including capturing the at least one biometric authentication signal of the person, and determining at least one of an access authorization stored in the user profile and a pre-defined travel destination stored in the user profile.

2. A method according to claim 1, further comprising transmitting a control signal to an elevator control when an access authorization to a travel destination is present and the authentication signal and the at least one reference correspond.

3. A method according to claim 1, wherein the biometric signal is at least one of the group consisting of a fingerprint, a hand geometry, a facial profile, an iris pattern, a retinal scan, a thermogram, an odor, a weight, a voice, a signature, a keystroke and a walking sequence.

4. A method according to claim 1, wherein the authenticating step includes authenticating the person from at least two authentication signals.

5. A method according to claim 1, further comprising:
   rendering available information about a travel destination of the person to a control device of the elevator installation; and
   checking by way of the control device whether the person is authorized to be transported to the travel destination by checking whether the travel destination is listed in an access authorization stored in a user profile.

6. A method according to claim 5, wherein given the presence of the access authorization to the travel destination, and given correspondence of the at least one biometric authentication signal and a reference stored in the user profile, at least one control signal is transmitted by way of the control device to an elevator control to transport the person to the travel destination.

7. A method according to claim 1, further comprising determining by a control device of the elevator installation a pre-defined travel destination stored in a user profile.

8. A method according to claim 7, wherein given the presence of the pre-defined travel destination, and given correspondence of the at least one biometric authentication signal and a reference stored in the user profile, at least one control signal is transmitted by way of the control device to an elevator control to transport the person to the pre-defined travel destination.

9. A system for security control and/or transportation of persons with an elevator installation, comprising:
   recognition means for recognizing at least one identification code of a person, the recognition means being mounted at a first location external to an elevator car and in close proximity to a landing door of the elevator installation;
   authentication means capturing at least one biometric authentication signal of the person, the authentication means being mounted at a second, different location before or in the elevator car, the at least one biometric authentication signal adapted to be used to check the at least one identification code of the person; and
   at least one control device that stores at least one user profile of the person, the user profile having at least one of an access authorization to a travel destination, a pre-defined travel destination, and a reference;
   wherein the control device is operative to check at least one of whether the travel destination of the person is listed in the access authorization, and whether the authentication signal corresponds with the reference.

10. A system according to claim 9 wherein the control device is operative to check whether a user profile exists for an identification code.

11. A system according to claim 7, further comprising:
    control means of the elevator installation;
    wherein given the presence of an access authorization and given correspondence of the at least one biometric authentication signal and a reference stored in a user profile, the control means are operative to transmit at least one control signal to an elevator control to transport the person to the travel destination.

12. A system according to claim 9, further comprising:
    control means of the elevator installation;
    wherein the control means are operative to determine a pre-defined travel destination, and given correspondence of the at least one biometric authentication signal and a reference stored in a user profile, the control means are operative to transmit at least one control signal to an elevator control to transport the person to the pre-defined travel destination.

13. A system according to claim 9, further comprising:
    control means of the elevator installation;
    wherein given no correspondence of the at least one biometric authentication signal and a reference stored in a user profile, the control means are operative to transmit at least one alarm signal, and if authentication takes place internal to the elevator car, an elevator door is closed and locked and the elevator does not commence travel.

14. A system according to claim 9, further comprising:
    control means of the elevator installation;
    wherein given no correspondence of the at least one biometric authentication signal and a reference stored in a user profile, the control means are operative to transmit at least one alarm signal, and if authentication takes place external to the elevator car, a landing door to the elevator installation is not opened.

15. A system according to claim 9, further comprising:
control means of the elevator installation;
wherein given no correspondence of the at least one biometric authentication signal and a reference stored in a user profile, the control means are operative to transmit at least one alarm to a security service.

16. A method for retrofitting an elevator installation with a system for security control and/or transportation of persons, comprising steps of:
installing at least one recognition device at a first location external to an elevator car and in close proximity to a landing door of the elevator installation for recognizing at least one identification code of a person; and
installing at least one authentication device at a second, different location before or in the elevator car of the elevator installation for capturing at least one biometric authentication signal of the person to check the at least one identification code of the person;
wherein the system for security control and/or transportation of persons is configured to assign at least one user profile to the identification code and to the authentication signal, identify at least one of entering and transmitting the at least one identification code by the person, capture the at least one biometric authentication signal of the person, and determine at least one of an access authorization stored in a user profile and a pre-defined travel destination stored in the user profile.

17. A system for security control and/or transportation of persons with an elevator installation, comprising:
a recognition device configured to recognize at least one identification code of a person, the recognition device being mounted at a first location external to an elevator car and in close proximity to a landing door of the elevator installation;
an authentication device configured to capture at least one biometric authentication signal of the person, the authentication device being mounted at a second, different location before or in the elevator car, the at least one biometric authentication signal adapted to be used to check the at least one identification code of the person; and
a control device configured to store at least one user profile of the person, the user profile having at least one of an access authorization to a travel destination, a pre-defined travel destination, and a reference;
wherein the control device is operative to check at least one of whether the travel destination of the person is listed in the access authorization, and whether the authentication signal corresponds with the reference.

\* \* \* \* \*